United States Patent [19]

Richelmann

[11] 3,715,662
[45] Feb. 6, 1973

[54] TEST CONTACTOR HEAD FOR CIRCUIT MODULES

[75] Inventor: Bernd H. Richelmann, San Diego, Calif.

[73] Assignee: Republic Corporation, Beverly Hills, Calif.

[22] Filed: Nov. 19, 1970

[21] Appl. No.: 90,952

[52] U.S. Cl. ............................. 324/158 F, 324/73 R
[51] Int. Cl. ........................ G01r 31/22, G01r 15/12
[58] Field of Search ............ 324/158 F, 158 R, 73 R

[56] References Cited

UNITED STATES PATENTS

| | | | |
|---|---|---|---|
| 3,408,565 | 10/1968 | Frick et al. | 324/158 F |
| 3,564,408 | 2/1971 | Schulz et al. | 324/158 F |

Primary Examiner—Rudolph V. Rolinec
Assistant Examiner—Ernest F. Karlsen
Attorney—Lindenberg, Freilich & Wasserman

[57] ABSTRACT

A contactor head useful in a testing complex for quickly receiving and contacting the leads of circuit modules, including a housing having a circuit module-receiving region and a compensating board-receiving region and having several pairs of resilient contact members. A button that is depressed when a circuit module is received, pivots a comb within the housing that deflects outer ends of the contact members against the leads of the circuit module. A plug-in compensating board is provided which has conductive strips that can lie against inner ends of the contacts, the board being wired with electrical compensating components. The plug-in boards enable rapid change of compensation to enable the same contactor head to be used for a variety of different circuit modules. An oil or grease film spread on the compensating board reduces current leakage from moisture condensation.

8 Claims, 7 Drawing Figures

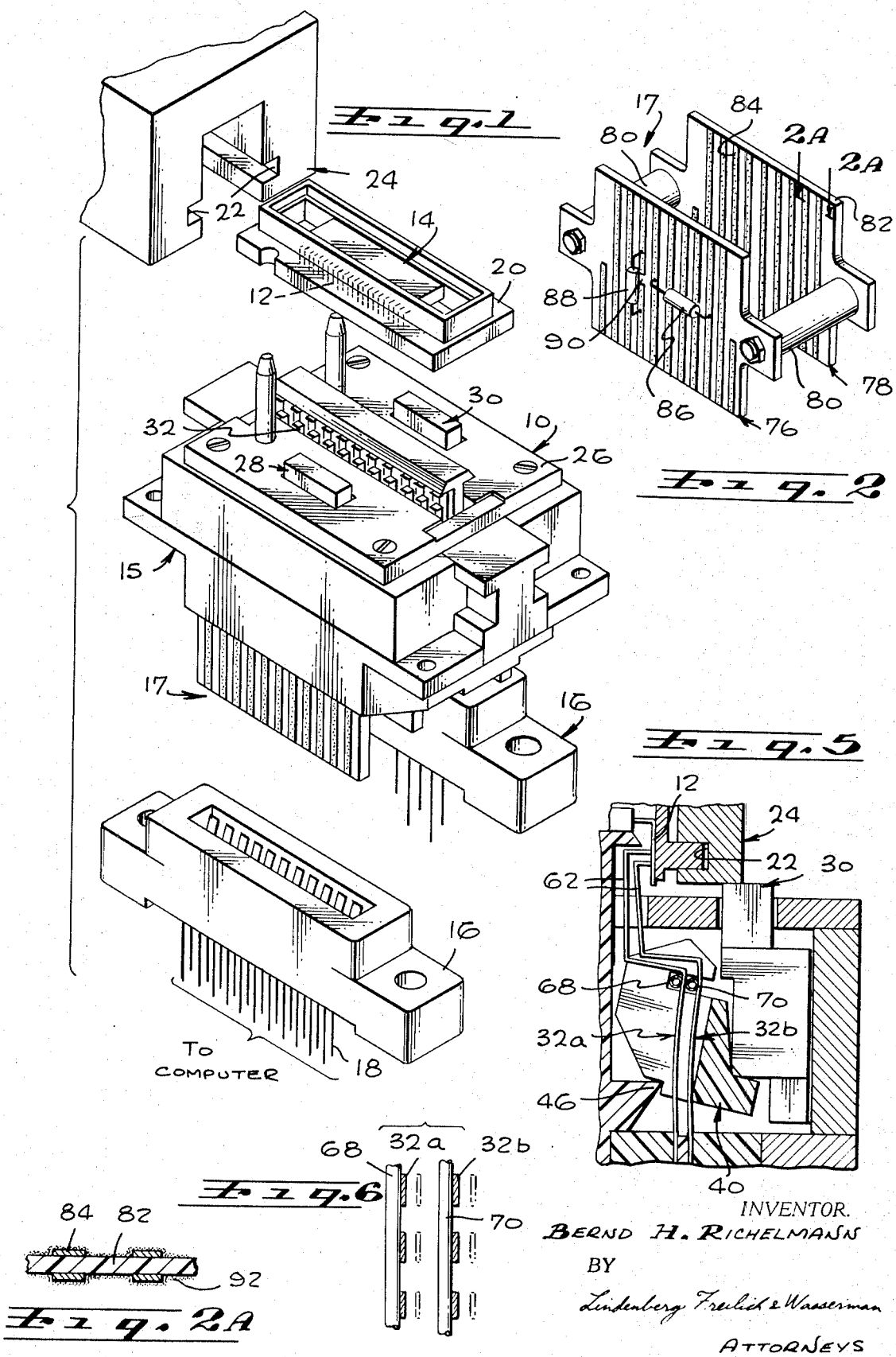

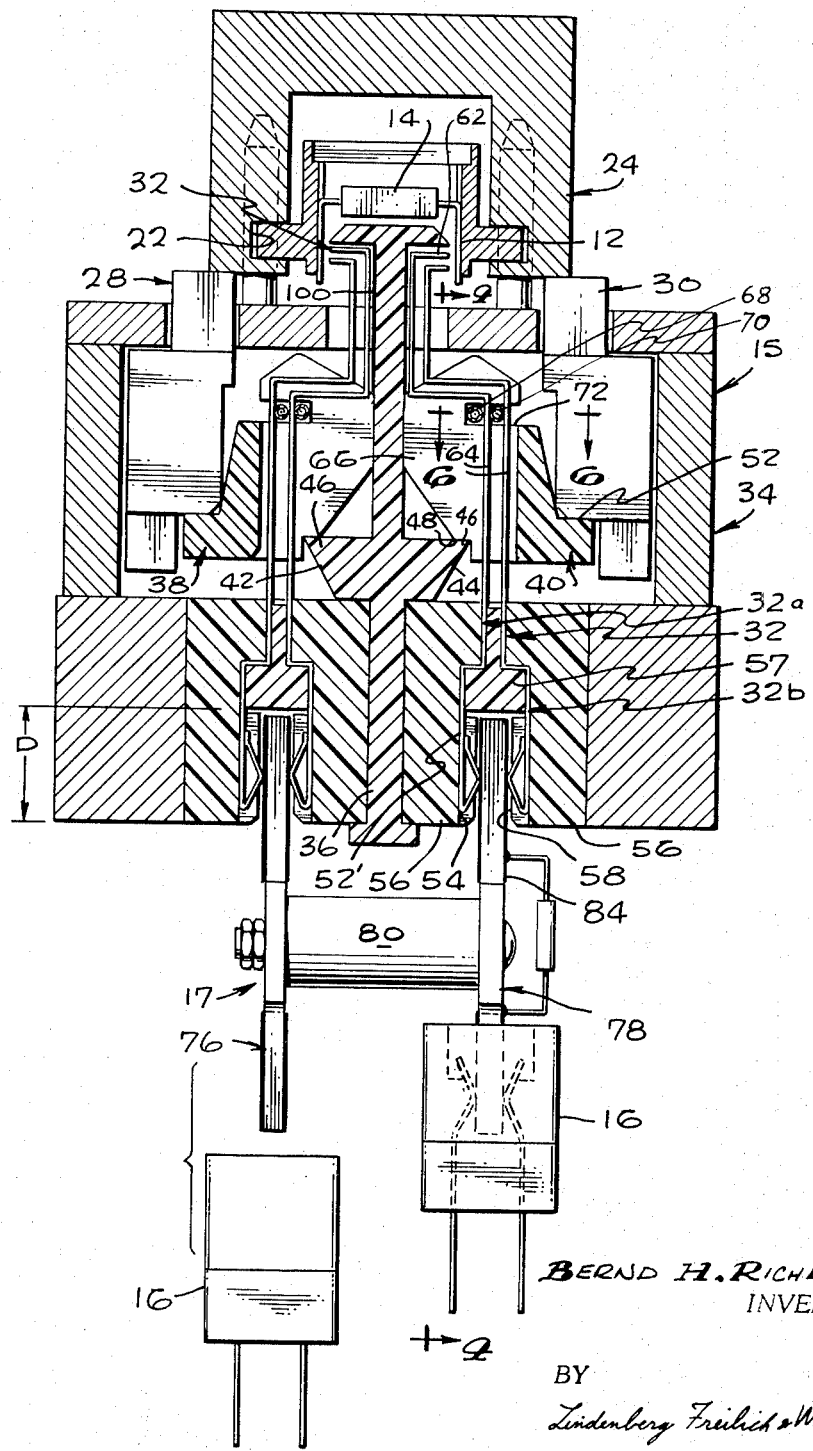

INVENTOR.
BERND H. RICHELMANN
BY
Lindenberg Freilich & Wasserman
ATTORNEYS

TEST CONTACTOR HEAD FOR CIRCUIT MODULES

BACKGROUND OF THE INVENTION

1. Field of the Invention

This invention relates to contactor heads that make rapid contact with the leads of circuit modules.

2. Description of the Prior Art

Integrated circuit modules can be mass tested by computer controlled test equipment, through the use of contactor heads that quickly receive a circuit module and make contact with its leads. It is important that the contactor heads reliably establish good electrical contact with the leads, inasmuch as the circuit modules have many leads and therefore poor contact with any one of them could result in rejection of a good module.

The contactor heads must not only operate reliably during substantial periods of high production testing, but must also operate under adverse conditions, as where the circuit modules are tested at very high or very low temperatures. The contactor heads must be meticulously constructed and they therefore command a high price. Because of the high price, it would be desirable to utilize only one or a few contactor heads for a test system. However, each contactor head generally must contain compensating circuitry adapting it to a particular type of circuit module, inasmuch as compensating circuitry usually must be connected very close to the circuit module leads for high frequency tests. A single contactor head can be used for testing different types of circuits if the compensating components are removed and new components are soldered in place, but the time and expense required to accomplish this is considerable. The alternative of providing a different contactor head for each of the many types of circuit modules that may have to be tested by a computer test system means that considerable funds must be invested in contactor heads.

OBJECTS AND SUMMARY OF THE INVENTION

An object of the present invention is to provide a contactor head which allows a rapid change of compensating circuitry at a minimal cost.

Another object is to provide a contactor head of very high reliability.

In accordance with one embodiment of the present invention, a contactor head assembly is provided which is simple and reliable and which enables the rapid replacement of compensating circuitry at moderate cost. The assembly includes a housing with a region for receiving a circuit module, and includes several pairs of resilient and electrically conductive contactor members. A comb which is pivotally mounted within the housing includes several slots for receiving the pairs of contactor members. A button that is depressed as a circuit module is received, pivots the comb to deflect outer ends of the contactor members against the leads of the circuit module. The spring force provided by the resilient contactor members provides substantially the only resistance to depression of the button, and provides the entire force for pivoting the comb back to its initial position when the module is removed. The pair of contactor members extending through each slot of the comb are maintained separated from each other by a rod of insulating material extending through the comb and between the contactor members. The rod also assures simultaneous deflection of both contactor members of each pair.

The contactor members have inner end portions fixed to the housing, with extreme inner ends extending into a board-receiving recess. A compensating board is provided which has a base of insulating material and several parallel conductive strips extending along its length. One end of the board can be plugged into the board-receiving recess of the housing to connect the strips to the inner ends of the contactor members. The portion of the board that projects from the housing is large enough to receive discrete compensating components and to provide an opposite end portion for receiving a plug that connects the board to a computer test system. A light coat of non-conductive oil or grease coats the circuit board to reduce leakage by moisture condensation on the board, particularly when it is run at low temperatures.

The contactor members have a strip-like shape, and the conductive strips on the compensating board have approximately the same cross-section, to minimize discontinuities in cross-section that could cause distortion for high frequency signals. The plug-in compensating boards enable a single contactor head to be used for a variety of circuit modules by merely removing one board and plugging in another one that contains the proper components for the new circuit module. The circuit boards are relatively simple and of much lower cost than the contactor heads, so that many boards can be provided to test many different circuit modules, at a minimal additional cost.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a test contactor head assembly constructed in accordance with the present invention, showing the manner of its connection to a circuit module and to a computer test system;

FIG. 2 is a perspective view of the compensating board of the contactor head assembly of FIG. 1;

FIG. 2A is a view taken on the line 2A—2A of FIG. 2;

FIG. 3 is a sectional side view of the contactor assembly of FIG. 1;

FIG. 5 is a partial sectional view of the apparatus of FIG. 3, shown with a circuit module partially received therein;

FIG. 6 is a view taken on the line 6—6 of FIG. 3; and

DESCRIPTION OF THE PREFERRED EMBODIMENTS

Figure 4:
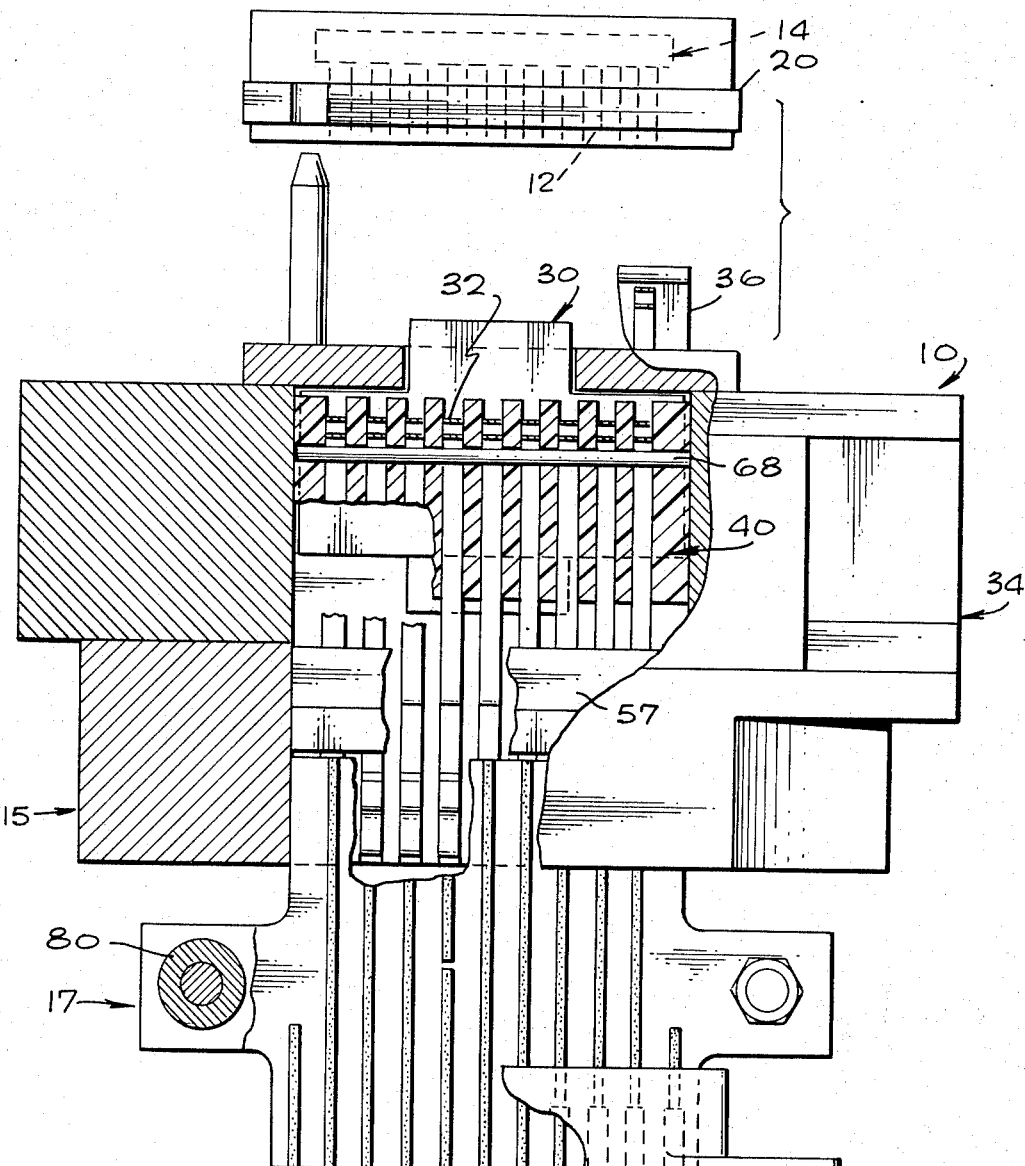
FIG. 4 is a view taken on the line 4—4 of FIG. 3.
Figure 7:
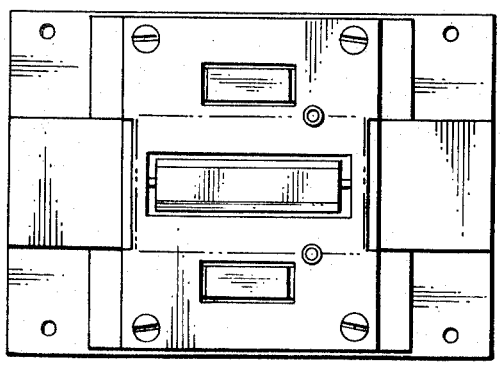
FIG. 7 is a plan view of the contactor head assembly of FIG. 1.

FIG. 1 illustrates a test contactor head assembly 10 which is designed to receive and make contact with the leads 12 of an integrated circuit module 14. The assembly includes a contactor head 15 and a plug-in compensating board assembly 17 that is connected to the head 15. A pair of connectors 16 which are coupled to the board assembly 17 have electrical leads 18 that are connected to a computer test system (not shown). The computer test system feeds test signals through some of the leads 18 and measures signal outputs from other leads 18 to check the performance of the integrated circuit module 14. The purpose of the test head assembly 10 is to provide means for rapidly and reliably connecting the computer leads 18 to the circuit module leads 12.

The circuit module 14 is of the dual in-line type which has two rows of leads 12 on either side thereof, and the particular test head assembly which is illustrated is designed to connect to that type of module. The circuit module 14 is held in a carrier 20 that can slide along the slots 22 of a chute section 24. In mass production testing, the carrier 20 hits a stop (not shown) at the end of the chute section 24, and a pneumatic cylinder (not shown) then moves the chute section and the carrier and circuit module therein against the upper end 26 of the contactor head 15. As the chute section 24 moves against the upper end of the contactor head, it depresses two protruding buttons of operating members 28 and 30 that are slidably mounted in the head. Depression of the buttons causes the outer ends of numerous contactor members 32 to move against the leads 12 of the circuit module, thereby establishing electrical contact with them, and therefore with the leads 18 that connect to the computer test system.

Referring now to FIG. 3, the contactor head 15 includes a housing 34 with a narrow central portion 36. The central portion 36 is constructed of a metal to provide good wear and has sheets of insulating material 100 thereon to prevent electrical contact with the contactor members 32. A pair of combs 38, 40 of insulating material are pivotally mounted on protruding parts 42, 44 of the central housing portion. Each protruding part, such as part 44, defines an acutely angled ledge 46. Each comb, such as comb 40, has an angled recess 48 that receives the ledge 46 for pivotal mounting thereon. The comb 40 also has a support ledge 52 that supports a lower portion of the operating member 30. The contactor members 32 extend through slots in the comb and urge it towards the standby position shown in FIG. 3.

The contactor members 32 are arranged in pairs, such as the pair 32a and 32b that are shown extending through the comb 40. Each contactor member is constructed of a strip of electrically conductive resilient material such as a beryllium nickel alloy with a gold plated surface thereon, and each contact member extends parallel to and spaced from the face of the other member of the pair. The contact members have inner end portions 52' which extend through slots 54 in a holder member 56 of the housing. A retainer 57 also engages the inner end portions 52' of the contactor members to fix their positions within the slots 54 in the holder members. A pair of holder members 56 is located at each side of the housing, and each pair defines a board-receiving recess 58 that can receive a compensating board. The inner end portions 52' of the contactor members extend into the board-receiving recess 58. The outer end portions 62 of the contactor members are disposed at the upper end or module-receiving region 26 of the contactor head assembly.

The center portions 64 of the pair of contactor members 32a and 32b extend through a slot 66 formed in the comb.

Two contactor members 32 are generally utilized for each circuit module lead, with one carrying very little current and the other sometimes carrying substantial current. In order to maintain the two contactor members 32a and 32b separated, and yet to enable the comb 40 to deflect them, a pair of deflector rods 68, 70 are provided that extend along the length of the comb through an aperture 72 therein. Both deflector members 68, 70 are constructed of insulating material, at least on their outer surfaces. One deflector member 68 is disposed at the bottom of the slot 72 in the comb while the other deflector member 70 is disposed between the two contactor members 32a and 32b. This allows both contactor members to be deflected simultaneously when the comb 40 pivots.

FIG. 5 illustrates the situation when the chute section 24 depresses the operating member 30 to cause contact between the leads 12 of the circuit module and the outer end portions 62 of the contactor members. When the operator member 30 is depressed, it pivots the comb 40 about the ledge 46. The comb moves the deflector member 68 to deflect the middle portion of the contactor member 32a, and thereby bend the contactor member so that its outer end touches the lead 12. The contactor member 32a presses against the other deflector member 70, causing it to deflect the middle portion of the other contactor member 32b. Thus, both contactor members are simultaneously deflected to make contact with the circuit module lead. When the chute 24 is raised to release the operating member 30, the contactor members 32a and 32b move the comb 40 back from the test position to its original standby position, and the comb raises the operating member 30 to the standby position. The resilient contactor members 32 supply the entire spring force that returns the comb 40 and operating member 30 to the standby positions. For a typical contactor head assembly that may contain 32 resilient contactor members, a relatively small force such as two pounds is all that must be overcome by the chute 24 in depressing the operating members 30. It may be noted that the contactor members 32 do not have any special critical bends at the locations where the deflector members 68 and 70 contact them, but may be merely flat and straight at that location.

In testing circuit modules that are designed to operate at high frequencies, it is often necessary to connect components such as capacitors or other impedance devices close to the leads of the module, to match and stabilize the circuit. The compensating board assembly 17 is provided to hold the components that are required to test a particular model of circuit module. As shown in FIG. 2, the board assembly 17 includes a pair of compensating boards 76 and 78 that are spaced from one another by a pair of spacers 80. Each board such as board 78, includes a base 82 of rigid insulating material and numerous strips 84 of electrically conductive material disposed on the base. The conductive strips 84 extend parallel to one another from one end of the base to the other. Electrical compensating components such as those shown at 86 and 88 can be readily connected to the conductive strips 84 by soldering or like operations. For the component 88 that is connected in series with a conductive strip, the conductive strip is broken at 90 in order to connect two strip portions that are insulated from each other.

As shown in FIG. 3, one end of each board, such as board 78, is designed to be received in the housing recess 58. When the board 78 is received in the recess, the conductive strips 84 on the board are contacted by the inner end portions 52' of the contactor members 32. The conductive strips 84 are spaced from one another by the same distance as the spacing of the contactor members 32 from one another along the length of the contactor head. This permits the conductive strips 84 to be connected to the contactor members by merely plugging the board into the recess 58. The boards 76 and 78 of the compensating board assembly can be connected to the computer by pushing the pair of the connectors 16 over their ends, the connectors 16 having contacts that touch the conductive strips of the board. Each compensating board 76, 78 has a length of more than three times the depth D of the test head recess 58, to provide sufficient room to mount the compensating components.

Both the contactor members 32 and the conductive strips 84 on the boards have elongated rectangular cross-sections with the same width and thickness. The use of rectangular conductors is desirable for high frequency applications to minimize signal distortion. The fact that the contactor members 32 and conductive strips 84 on the boards have the same cross-section means that there is a minimum of signal reflections or other distortions that result when high frequency signals pass through a conductive path with discontinuities in cross-section. Thus, the compensating board assembly not only enables compensating components to be held close to the leads of the circuit modules, but also minimizes signal distortions that might occur in the path between the circuit module leads 12 and the compensating components.

Generally, the contactor head assembly 10 is set up to test a large number of circuit modules which are all of the same type. When it is desired to test a different type of circuit module (of the same outer shape but with a different circuit therein), it is often necessary to change the compensating circuitry. This can be readily accomplished by merely unplugging the compensating board assembly 17 and replacing it with another compensating board assembly which contains a different set of compensating components specifically adapted to the new circuit to be tested. The compensating board assembly 17 is relatively inexpensive as compared to the contactor head 15 which it plugs into, so that the provision of many plug-in compensating circuit boards that can be used in a single test head enables a minimal capital investment in test equipment. The replacement of the plug-in compensating board assemblies can often be accomplished faster than a new test head could be installed, so that change-over to a different circuit can be accomplished more rapidly than if a separate test head were provided for each circuit to be tested.

In many testing situations, there is a possibility that moisture will condense on the equipment and cause substantial current leakage. This possibility is especially great where the test contactor assembly is employed during testing at low temperatures. Moisture is especially liable to condense on the conductive strips 84 of the compensating board assembly. In order to minimize current leakage, a light film of oil, such as that shown at 92 in FIG. 2A is spread on the compensating circuit boards, and particularly over the conductive strips 84 thereon. The oil, which may be a silicone type, is electrically non-conductive, and it resists direct contact of condensed moisture with the strips. The oil film does not interfere with rapid insertion of the boards into the contactor head, inasmuch as the spring force of the contactor members 32 press through the oil film and make good contact with the conductive strips 84 thereon. The oil film can also be spread on parts within the housing 34 of the contactor head. Various types of non-conductive oil can be used, including heavier types which are often referred to as grease, so long as they have the characteristic of being spreadable on the conductive strips and boards, and easily pushed aside when contact is to be made with a strip.

Thus, the invention provides a contactor head assembly which is simple and rugged and which enables rapid conversion for different circuits at a minimal cost. The use of contactor members 32 that supply the total spring deflecting force minimizes the required activating force and also minimizes stress and wear on parts, thereby assuring greater reliability. The simple deflector members 68, 70 that deflect the contactor members 32 against circuit module leads, move against straight portions of the contactor members that are spaced a substantial distance from the outer ends 62 thereof. This enables substantial over-travel of the comb 40 without excessively bending and permanently setting the contactor members. The deflector members 68, 70 provide a simple means for assuring that both contactor members of a pair deflect simultaneously, while allowing them to be easily mounted in the contactor head. The plug-in compensating circuit boards provide a simple and rapid method for installing compensating circuitry for a variety of different circuit modules to be tested. The use of an oil, particularly on the compensating circuit board, minimizes leakage that might be caused by moisture condensation, without hampering rapid connection of the boards in the circuit.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a test contactor which includes a housing that has a circuit module-receiving portion and a board-receiving recess, and resilient contactor members with outer ends at said module-receiving portion and inner ends within said board-receiving recess, the improvement comprising:

a compensating board which includes a base of electrically insulating material, a plurality of strips of electrically conductive material spaced from one another on said base, said board shaped for insertion into said recess so that said inner ends of said contactor members contact said strips, and said board including a film of electrically insulative oil-like material covering at least most of the surface of said conductive strips, whereby to reduce current leakage if moisture condenses on said board.

2. A contactor head for testing dual-inline packaged integrated circuit modules that have leads comprising:

a housing having a first end for receiving one of said circuit modules and a second end with a pair of recesses for receiving compensating boards, said housing having a pair of elongated ledge portions there-within;

a pair of elongated comb members, each having a recess that receives one of said ledges for pivotal mounting thereon, and each having a plurality of slots spaced along its length;

a pair of operating members having outer button ends at said first end of said housing and inner ends engaged with said comb members to pivot them from second to first positions as said button ends are depressed;

a plurality of strip-shaped contactor members constructed of electrically conductive resilient material, each having an inner end portion mounted on said housing and extending into one of said board-receiving recesses, a middle portion extending through one of said slots in one of said comb members, and an outer end portion positioned at said first end of said housing, said inner end portions of said contactor members mounted to bias said comb members towards said second position thereof and to bias said outer ends of said contactor members away from the position of leads of a circuit module received at said first housing end; and a compensating board assembly which includes a pair of compensating boards for receiving electrical compensating components and shaped for insertion in said recesses of said housing, each board having an insulative base and a plurality of strips of electrically conductive material spaced from each other to contact said inner end portions of said contactor members.

3. The contactor head described in claim 2 wherein:
said plurality of contactor members are arranged in pairs, both contactor members of a pair extending through the same slot in a comb member;
each comb member has an aperture extending along its length and intersecting said slots; and including
an elongated deflector member extending through the aperture of each of said comb members and between the pair of contactor members in each slot to separate them while permitting their simultaneous deflection.

4. A head for testing circuit modules with leads comprising:

a housing having a module receiving portion for receiving the leads of said modules and a second portion having at least one elongated recess for receiving the end of a compensating board;

a plurality of resilient elongated contact members disposed within said housing, said contact members having outer end portions at said module receiving portion and inner end portions disposed along said recess;

comb means mounted to move between first and second positions within said housing, said comb means engaged with each of said contact members at positions spaced from said outer end portions thereof, to deflect said contact members so their outer end portions move against said circuit module leads as said comb means moves from said second position to said first position;

said housing including walls for fixing the position of said contact members at locations along said inner end portions so that said contact members bias said comb means towards said second position;

operating means responsive to the reception of a circuit module at said module receiving portion, for moving said comb means towards said first position; and a compensating board having a base of insulating material with first and second ends and a plurality of parallel electrically conductive strips thereon extending between said ends of said board, said first end of said board formed for reception in said recess so that said conductive strips contact said inner end portions of said contact members, and said board having a length between said ends thereof more than three times the depth of said recess to permit coupling to a connector at said second end of said board and still leave room for the mounting of electrical compensating components on the board portion between said ends.

5. The head described in claim 4 including:
at least one discrete impedance member having first and second leads directly electrically connected to portions of said conductive strips of said compensating board which are electrically insulated from each other.

6. The head described in claim 4 wherein:
said contact members are strip-shaped; and
said conductive strips of said compensating board each have a width and thickness substantially equal to the width and thickness of each of said contact members, whereby to reduce distortion at high frequencies.

7. A head for testing circuit modules with leads comprising:

a housing having a module receiving portion for receiving the leads of said modules and a second portion;

first and second sets of strip-shaped resilient elongated contact members disposed within said housing, each member of the first set extending parallel to and spaced from the face of said second set, said contact members having outer end portions at said module receiving portion and inner end portions at said second housing portion;

comb means including an elongated comb mounted to move between first and second positions within said housing to deflect said contact members so their outer end portions move against the circuit module leads as the comb moves to the first position, said comb having a plurality of slots spaced along its length, each slot receiving one of the contactor members of said first set and one of the contactor members of said second set, and said comb means also including a pair of elongated deflector members extending along the length of said comb, one deflector member positioned between the bottom of each slot and the contactor member of the first set therein, and the other deflector member positioned between the contactor member of the first set and the contactor member of the second set therein;

said housing including walls for fixing the position of said contact members at locations along said inner end portions so that said contact members bias said comb means towards said second position; and operating means responsive to the reception of a circuit module at said module receiving portion, for moving said comb means towards said first position.

8. A head for testing circuit modules with leads comprising:
 a housing having a module receiving portion for receiving the leads of said modules, a second portion, and walls defining an acutely angled ledge;
 a plurality of resilient elongated contact members disposed within said housing, said contact members having outer end portions at said module receiving portion and inner end portions at said second housing portion;
 comb means including a comb member with a recess that receives said ledge on the housing for pivotal mounting thereon to permit movement of the comb between first and second positions within said housing, said comb means engaged with each of said contact members at positions spaced from said outer end portions thereof, to deflect said contact members so their outer end portions move against said circuit module leads as said comb means moves from said second position to said first position, said contact members being biased towards the comb to urge the comb into engagement with the ledge;
 said housing including walls for fixing the position of said contact members at locations along said inner end portions so that said contact members bias said comb means towards said second position; and
 operating means responsive to the reception of a circuit module at said module receiving portion, for moving said comb means towards said first position, including a button slidably mounted on said housing with an outer portion normally projecting from said housing and an inner angled portion engaged with said comb to pivot it when said outer button portion is depressed.

* * * * *